United States Patent
Giere et al.

[11] Patent Number: 5,943,191
[45] Date of Patent: Aug. 24, 1999

[54] HEAD SUSPENSION WITH RESONANCE DAMPING EXTENSION

[75] Inventors: Scott C. Giere; Daniel D. Willard; Robert B. Evans, all of Hutchinson, Minn.

[73] Assignee: Hutchinson Technology, Inc., Hutchinson, Minn.

[21] Appl. No.: 08/979,834

[22] Filed: Nov. 26, 1997

[51] Int. Cl.⁶ .................................................. G11B 21/21
[52] U.S. Cl. .............................................................. 360/104
[58] Field of Search ................................. 360/104, 105, 360/106

[56] References Cited

U.S. PATENT DOCUMENTS

| | | | |
|---|---|---|---|
| 3,713,121 | 1/1973 | Fasano et al. | 360/105 |
| 4,280,156 | 7/1981 | Villette | 360/105 |
| 5,187,625 | 2/1993 | Blaeser et al. | 360/104 |
| 5,299,081 | 3/1994 | Hatch et al. | 360/104 |

FOREIGN PATENT DOCUMENTS

| | | | |
|---|---|---|---|
| 1-92975 | 4/1989 | Japan . | |
| 2-292784 | 12/1990 | Japan | 360/104 |
| 3-71476 | 3/1991 | Japan . | |
| 5-325459 | 12/1993 | Japan . | |
| 6-124424 | 5/1994 | Japan . | |
| 2-15412 | 4/1998 | Japan . | |
| WO 98109275 | 3/1998 | WIPO . | |

OTHER PUBLICATIONS

Shock and Vibration Handbook, Third Edition, by Cyril M. Harris, 1 page.
"Mechanical Vibrations—$2^{nd}$ ed." Addison–Wesley Pub., pp. 465–468.

*Primary Examiner*—David D. Davis
*Attorney, Agent, or Firm*—Faegre & Benson LLP

[57] ABSTRACT

A head suspension including a load beam and flexure having a damping member for damping vibrations of the head suspension at a resonance mode frequency thereof. The load beam includes a mounting region at a proximal end, a rigid region adjacent to a distal end, and a spring region between the mounting region and the rigid region. The flexure is at the distal end of the load beam and is for supporting a head slider. The damping member extends from the head suspension and has a free end such that it can frictionally contact the head suspension to damp resonance mode frequency vibrations thereof.

24 Claims, 13 Drawing Sheets

HEAD SUSPENSION WITH RESONANCE DAMPING EXTENSION

BACKGROUND

1. Technical Field

The present invention relates generally to head suspensions for supporting read/write heads over recording media. In particular, the present invention is directed to head suspensions having vibration damping structures particularly effective at resonance frequencies.

2. Background of the Invention

Head suspensions are well known and commonly used within dynamic magnetic or optical information storage devices or drives with rigid disks. The head suspension is a component within the disk drive which positions a magnetic or optical read/write head over a desired position on the storage media where information is to be retrieved or transferred. Head suspensions for use in rigid disk drives typically include a load beam that generates a spring force and supports a flexure to which a head slider supporting a read/write head is to be mounted. The load beam typically includes a base at a proximal end, a rigid region at a distal end, and a spring region between the rigid region and the base for providing the spring force. The head slider is aerodynamically designed so as to allow the read/write head to "fly" on an air bearing generated by the spinning magnetic or optical storage disk against the opposing spring force. The flexure permits pitch and roll motion of the head slider and read/write head as they move over the data tracks of the disk. Head suspensions are normally combined with an actuator arm to which the base of the load beam is mounted so as to position (by linear or rotary movement) the head suspension, and thus the head slider and read/write head, with respect to data tracks of the rigid disk.

With the advent of more powerful computers and the rapid growth in the personal computer market, it has become increasingly more important to enable the user to store and access data to and from storage devices with increased speed and accuracy. Because of this need to reduce access times to enable rapid storage retrieval of data it has become increasingly more important to reduce undesirable levels of vibration of components within the rigid disk drive.

In relation to this, an important consideration in the design of head suspensions is resonance characteristics; that is, the head suspension's performance at its resonance frequencies. Resonance characteristics of a head suspension are particularly important because a head suspension is more sensitive to vibrations at a resonance frequency thereof than to vibrations at non-resonance frequencies. That is, if the servo system, or other portion of the ambient environment external to the head suspension and coupled to the head suspension via the actuator arm, is vibrating or causes vibration of the head suspension at a frequency at or near a resonance frequency of the head suspension, the resulting vibration of the head suspension will be at its resonance frequency. The amplitude of the movement of this vibration at the head slider will be greater than if the servo system, and therefore head suspension, were vibrating at a non-resonance frequency. That is, the gain (the ratio of the amplitude of the motion of a head suspension at the head slider to the amplitude of the motion input into a head suspension at its base) of a head suspension is significantly larger when the input motion is a vibration at a resonance mode frequency of the head suspension than when the input is a vibration at a non-resonance mode frequency thereof. Further, if an impulse force is imparted to the head suspension, as opposed to an ambient vibration or electrically induced, vibration in the head suspension at resonance mode frequencies can naturally result. Such an impulse force could be caused by quickly stopping the head suspension over a data track to read or write information as well as by an externally applied force.

Because vibration of a head suspension at a resonance mode frequency can have large gain, such vibrations can cause delay in the read/write process. Specifically, vibrations of the head suspension at a resonance mode frequency may delay the transfer of data because the data cannot be confidently transferred until the amplitude of the movement of the head slider has substantially decayed.

Of particular importance are the first and second torsion resonance modes and lateral bending (or sway) resonance mode of vibration. These resonance modes can result in lateral movement of the head slider at the end of the head suspensions and are dependent on cross-sectional properties along the length of the load beam. The torsion modes sometimes produce a mode shape in which the tip of the resonating suspension assembly moves in a circular fashion. However, since the head slider is maintained in a direction perpendicular to the plane of the disk surface by the spring force of the load beam acting against the air bearing, lateral motion of the rotation is seen at the head slider. The sway mode is primarily lateral motion. The first torsion resonance mode is of particular importance because it usually occurs at frequencies which are low enough to be commonly encountered in rigid disk drive suspensions (typically below 5000 Hz).

Approaches to minimize the effect of resonance modes include designing the head suspension so that certain resonance modes are high enough so as not to be excited within a particular disk drive or to minimize the movement of the head slider or gain that results from one or more resonance mode(s). The latter can be accomplished by designing the head suspension so that gain is minimal or by damping the movement.

The use of dampers on head suspensions to decrease gain at resonance mode frequencies is generally known and described, for example, in U.S. Pat. No. 5,187,625 issued to Blaeser et al. on Feb. 16, 1993 ("Blaeser") and U.S. Pat. No. 5,299,081 issued to Hatch et al. on Mar. 29, 1994 ("Hatch").

Both Blaeser and Hatch disclose the use of elastic and visco-elastic damping materials located on a part of the head suspension to absorb vibrations. However, use of such materials often necessitates the addition of curing or outgassing steps to the fabrication process. Further, the use of such materials requires care to prevent the attraction of contaminants both during the fabrication process and during in situ use. Also, such damping materials typically require the addition of a constraint layer of stainless steel or other rigid material over an exposed surface of the damper. As such, use of these types of dampers can add significant mass to the head suspension. Added mass (depending upon where it is localized) can increase the time required for vibrations of the head suspension to decay and, thus, increase information access times. Further, adding viscous material to a head suspension can add steps to the manufacturing process, slowing the process and increasing costs.

SUMMARY OF THE INVENTION

The present invention includes a head suspension having a vibration damping structure which is efficient to manufacture, and which adds little or no mass to the head suspension. In particular, the head suspension includes a load beam having a mounting region, a rigid region, and a spring region. A flexure is located at a distal end of the load beam and is for supporting a head slider. The head suspension also includes a first edge and a damping member which is mounted to the head suspension adjacent to the first edge and which extends at least partially across the head suspension towards a second edge thereof. During a vibration of the head suspension at a resonance mode frequency thereof, the damping member vibrates and frictionally contacts a portion of the head suspension to damp the vibration of the head suspension at a resonance mode frequency thereof.

Preferably, the damping member extends over the second edge. In this way, the damping member frictionally contacts the second edge during a vibration of the head suspension at the resonance mode frequency thereof.

DETAILED DESCRIPTION

Figure 1:
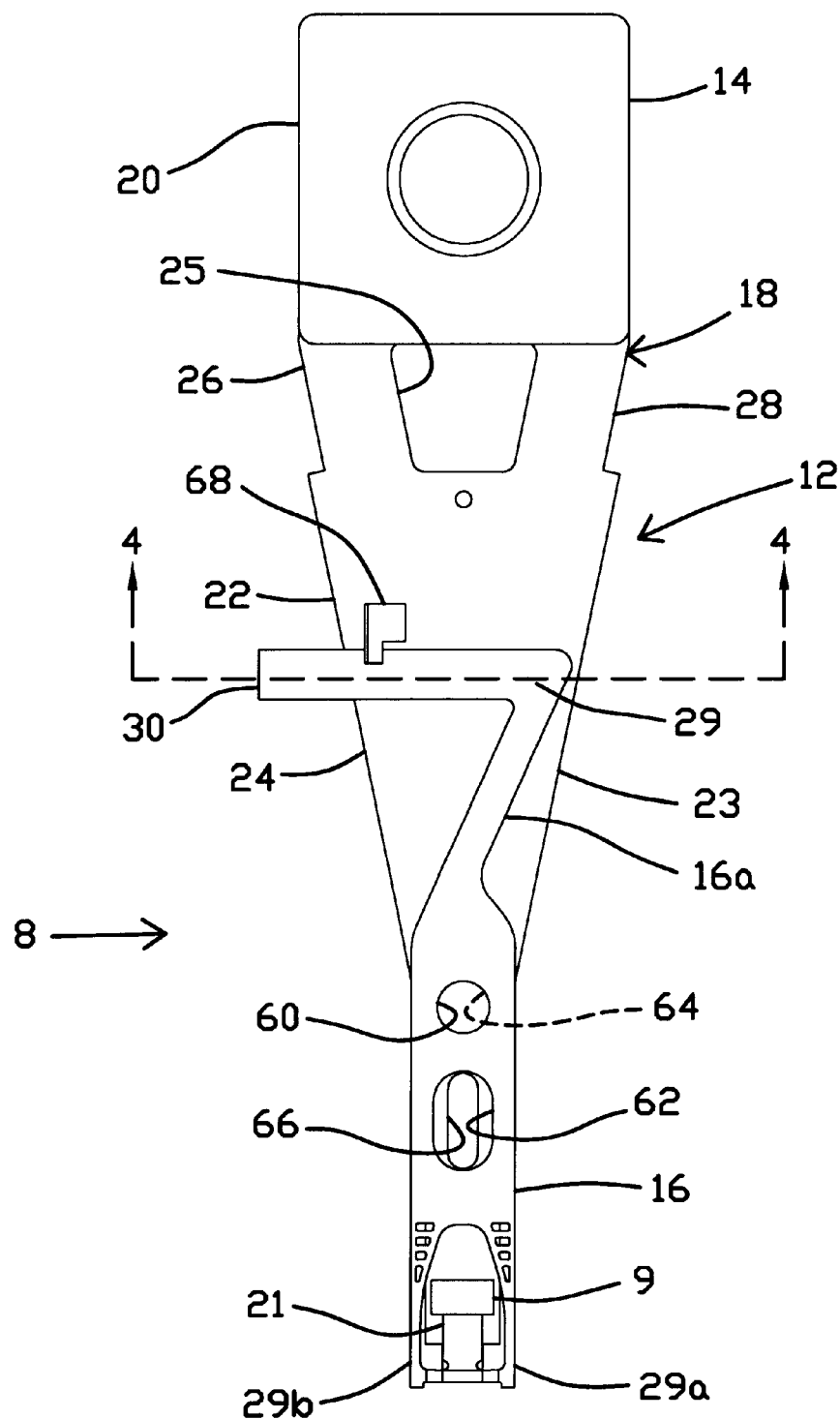
FIG. 1 is a bottom view of a head suspension including a damping member unitary with the flexure in accordance with the present invention.

With reference initially to FIG. 1, a head suspension 8 is illustrated from the bottom and includes a load beam 12 and a damping member 30. Load beam 12 includes a base or mounting region 14 on a proximal end, a relatively rigid region 22 adjacent a distal end, and a radius or spring region 18 between the mounting region 14 and rigid region 22. A flexure 16 is mounted at the distal end of load beam 12 for providing a spring connection between the load beam and head slider 9. Though flexure 16 is shown as a separate component from load beam 12, it is also contemplated to form flexure 16 integrally with load beam 12 as a single component therewith. A base plate 20 is mounted to mounting region 14 for attaching the suspension 8 to a disk drive actuator arm (not shown in FIG. 1). The rigid region 22 has first and second lateral edges 23 and 24, respectively, at transversely spaced, opposite sides which converge towards the distal tip of head suspension 8. Preferably, spring region 18 has an aperture 25 located in the center thereof to control the spring force of load beam 12. Aperture 25 forms a first radius arm 26 on one side thereof and second radius arm 28 on the opposite side thereof. Alignment apertures 64 and 66 are preferably provided for alignment of flexure 16 with load beam 12 when mounting flexure 16 to load beam 12. Load beam 12 can be fabricated and formed from a sheet of stainless steel or other resilient material in a conventional manner.

The spring region 18 of the load beam 12 includes a preformed bend or radius. This radius provides the spring or load force and thus a desired load to a head slider 9 for a predetermined offset height, the offset height being a measurement of the distance between the mounting height of the head suspension to the actuator arm and the head slider 9 in a loaded state at fly height.

A resilient connection is provided between the head slider 9 and the distal end of the load beam 12 by a flexure 16 located at the distal end of the load beam and which permits head slider 9 to move in pitch and roll directions so that it can compensate for fluctuations of a spinning disk surface above which the head slider 9 flies. Flexure 16 preferably includes tongue 21 supported between spring arms 29a and 29b to allow for pitch and roll motion of the head slider 9. Flexure 16 also preferably includes alignment apertures 60 and 62 for alignment with apertures 64 and 66, respectively, of load beam 12 when mounting flexure 16 to load beam 12. Many different types of flexures, also known as gimbals, are known to provide the resilient connection allowing for pitch and roll movement of head slider 9 and are contemplated to be used with the present invention. It is also contemplated to form the flexure integrally with the load beam, as known, rather than as a separate component such as flexure 16.

In the embodiment of FIG. 1, rigid region 22 has a top face and a bottom face and resilient damping member 30 extends transversely across the bottom face of the rigid region 22 of load beam 12 and, as described below, acts to reduce the gain at head slider 9 of resonance mode vibrations of head suspension 8. Damping member 30 can be used in conjunction with elastic or visco-elastic dampers either with or without constraint layers.

In the embodiment of FIG. 1, damping member 30 is formed integrally with flexure 16. Flexure 16 preferably includes an elongated portion 16a extending diagonally along the bottom side of rigid region 22 to a point nearly adjacent to lateral edge 23 of rigid region 22. Damping member 30 preferably extends from a proximal end of elongated portion 16a of flexure 16, transversely across rigid region 22 and across lateral edge 24.

Figure 2:
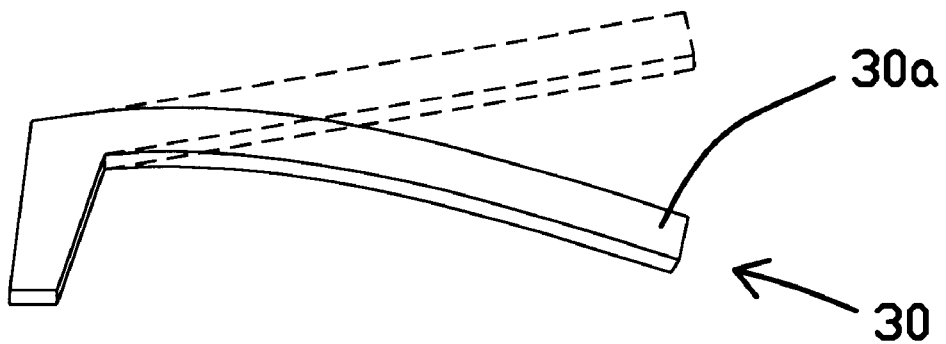
FIG. 2 is an isometric view of the damping member shown in FIG. 1.

Damping member 30 is shown as a rectangular strip extending from rigid region 22 past lateral edge 24. Damping member 30 can be welded, adhered, or otherwise attached at mounting point 29 adjacent to edge 23 of the rigid region 22. However, other locations for attachment of member 30 to head suspension 8 are also within the ambit of the present invention. The portion of damping member 30 extending beyond attachment point 29 remains un-attached to load beam 12. In this way damping member 30 acts as a cantilever beam type structure, similar to load beam 12. Because damping member 30 is a cantilever beam type structure, its free end 30a can vibrate as shown in FIG. 2 which is an isometric illustration of damping member 30. As shown in phantom in FIG. 2, free end 30a of damping member 30 can pass out of the plane of load beam 12 when damping member 30 is vibrating.

Because damping member 30 acts as a cantilever type beam structure, it is contemplated, though not necessary, to include shock limiter 68 on load beam 12. Shock limiter 68 protrudes from rigid region 22 of load beam 12 and extends over damping member 30 without touching damping member 30 when damping member 30 is in an undeformed or neutral state. Because shock limiter 68 is rigidly attached to load beam 12, the travel of damping member 30 in a direction transverse to the plane of load beam 12 is "limited" to remain between load beam 12 and shock limiter 68. Thus, shock limiter 68 acts to reduce the possibility that damping member 30 will permanently or plastically deform in a direction perpendicular to load beam 12 as a result of a physical shock thereto. Details of the function and fabrication of limiters such as shock limiter 68 are fully disclosed in co-pending U.S. patent application Ser. No. 08/653,937, filed May 23, 1996 now U.S. Pat. No. 5,771,136 for "Suspension Assembly For Mounting A Head Slider Having A Flexure With A Shock Limiter" owned by the assignee of the present application, and hereby incorporated by reference in its entirety.

Figure 3:
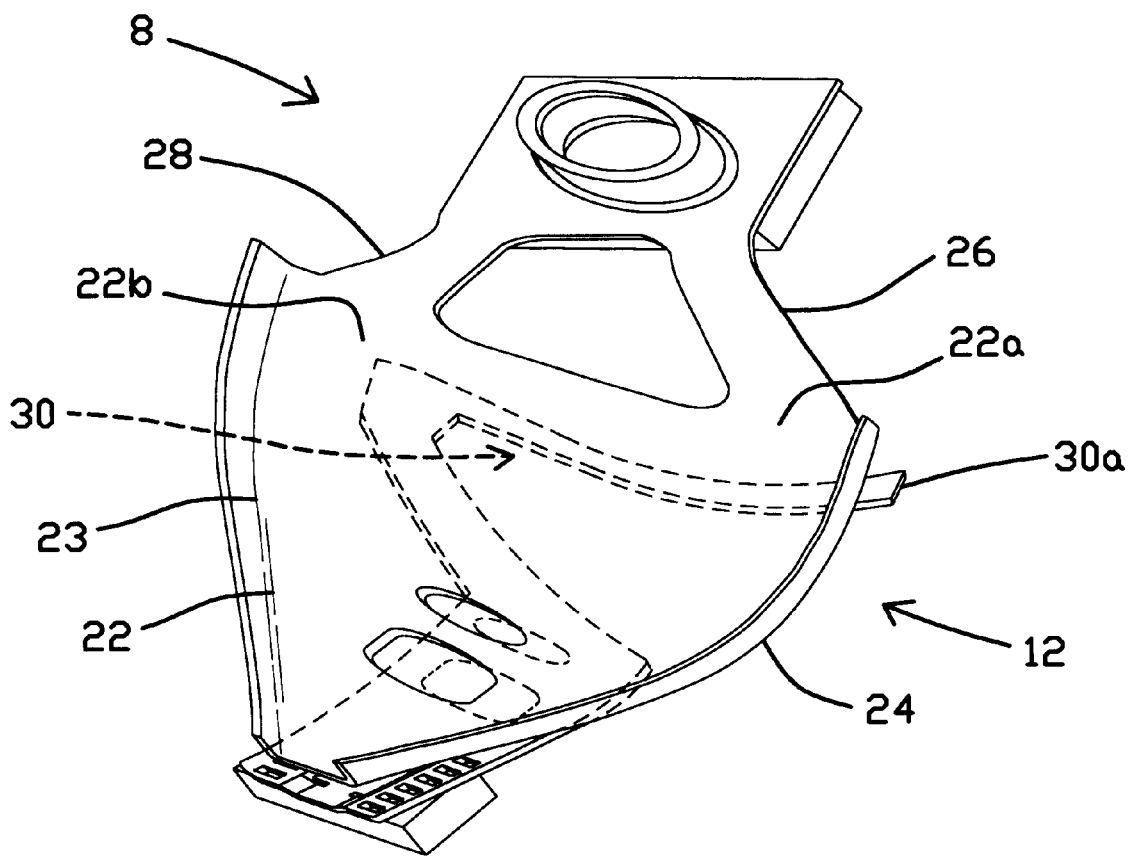
FIG. 3 is an exaggerated isometric view of the load beam shown in FIG. 1 within a cycle of its first torsion resonance mode vibration with the damping member frictionally contacting the load beam.

As noted above, the first torsion resonance mode of load beam 12 is of particular importance because the frequency thereof is typically within a range of frequencies that are commonly present during operation of a disk drive storage system. FIG. 3 is a perspective view of head suspension 8 and damping member 30 undergoing first torsion mode resonance vibration of the head suspension. In this mode, load beam 12 distorts such that the area 22a of the rigid region 22 just distal to radius arm 26 and adjacent to lateral edge 24 moves out of the plane of area 22b of the rigid region 22 just distal to radius arm 28 and adjacent to lateral edge 23. Because damping member 30 is attached to load beam 12 nearly adjacent to lateral edge 23, it is believed that bending of damping member 30 will closely follow the surface of load beam 12 as head suspension 8 goes through its first torsion mode resonance. Thus, it is believed that as area 22a moves, damping member 30 lags slightly behind. Then, when surface 22a reaches a point of furthest excursion of the waveform of the first torsion resonance mode and begins to move again back towards its neutral (non-deformed) position, the free end of damping member 30 strikes or frictionally contacts area 22a near lateral edge 24. It is thought that this collision between damping member 30 and load beam 12 acts to dissipate energy which is driving the resonance vibration, thereby damping the resonance vibration.

When the torsional motion of the load beam reverses direction, it is thought that the free end 30a of damping member 30 lags behind the motion of the end of member 30 attached to load beam 12 creating an opposing moment at, or pulling on, the attached end, which causes a suppression of the vibrational motion.

It is thought that a second mechanism by which damping member 30 acts to damp vibrations at a resonance mode frequency of head suspension 8 is rubbing. As load beam 12 goes through the vibration cycle associated with the first torsion resonance mode as described above, damping member 30 may, it is thought, in addition to or instead of striking, rub against the surface of the rigid region 22 located beneath damping member 30. Both striking and rubbing actions between damping member 30 and head suspension 8 can be considered frictional contact therebetween. Because damping member 30 extends over edge 24, it is believed that damping member 30 can also engage in frictional contact with edge 24 during a vibration cycle. This acts to dissipate energy driving the resonance vibrations, thereby damping the resonance vibrations.

As shown in FIG. 3, when head suspension 8 is vibrating in its first torsion mode resonance, areas 22a and 22b on either side of a central longitudinal axis, which extends from the proximal end of head suspension 8 to a distal end thereof, engage in opposing motion. When area 22a is moving upwards, area 22b is moving downwards, and vice-versa. This is true of any torsion mode resonance vibration or any resonance mode vibration having a component of a torsional resonance mode. For example, a lateral bending mode may comprise a combination of mode shapes including a torsional component. Thus, for damping member 30 to damp vibrations of head suspension 8 which have a component of torsional motion in which areas on either side of a central longitudinal axis of head suspension 8 move in opposing directions as shown in FIG. 3, it is only necessary that damping member 30 be attached to head suspension 8 at a location between the central longitudinal axis and a lateral edge, such as edge 23, of head suspension 8; and that a free end of damping member 30, such as free end 30a, extend transversely including diagonally over to the opposite side of the central longitudinal axis. That is, what matters in damping a vibration at a torsional resonance mode frequency of head suspension 8 is that the transverse extent of the damping member 30 is sufficient to cause striking and/or rubbing with a surface or the edge of the load beam based on displacement caused by the torsional mode.

This being the case, a damping member such as damping member 30 can likewise act to damp a vibration at any resonance mode frequency of a head suspension as long as the particular resonance mode frequency has a defined mode shape in which a first portion of the head suspension moves in an opposite direction to a second portion of the head suspension at some time during a cycle of the vibration at the resonance mode frequency. A damping member such as damping member 30 can be used to damp such vibrations at a resonance mode frequency of a head suspension by mounting the damping member at a mounting point over the first portion in an orientation so that a free section of the damping member, spaced from the mounting point thereof, extends to a location over the second portion of the head suspension. The damping member can then also extend over an edge of the second portion if such an edge exists, but it need not. As with any damping member in accordance with the present invention, the damping member's location and extension should be so that a frictional contact will result between a free section of the damping member and the second portion of the head suspension based upon the amount of movement experienced at the appropriate resonance mode.

Accordingly, not only can torsional resonance modes and modes having torsional resonance mode components be damped, but also other modes such as longitudinal bending modes and modes having longitudinal bending resonance mode components. A longitudinal bending resonance mode is one in which a first surface portion of the head suspension which is proximal to a second surface portion thereof will move in a opposite direction to the second surface portion at some time during the cycle of the longitudinal bending mode. As such, a damping member mounted over the first surface portion and extending in a direction having a longitudinal component, to a location above the second surface portion will frictionally contact and act to damp a vibration of a head suspension at a longitudinal bending mode resonance frequency thereof.

It was found that to dissipate a significant quantity of energy and effectively damp vibrations at a resonance mode frequency of load beam 12, it is preferable that the end of damping member 30 not attached to head suspension 8 extend past some edge of head suspension 8 having a longitudinal component and on the opposite side of the central longitudinal axis from attachment point 29. It is thought that this finding is due to the frictional interaction between the damping member 30 and the edge over which it extends. In the embodiment shown in FIGS. 1 and 2, this edge is lateral edge 24 of load beam 12. It is contemplated, however, that damping member 30 extend over another edge. This is not to say, however, that the damping member 30 must extend over an edge of head suspension 8. It may just rely on rubbing or striking interactions with a surface of head suspension 8. It was also found that damping member 30 more effectively damps vibrations of head suspension 30 at resonance mode frequencies thereof when damping member 30 is mounted adjacent or nearly adjacent to a lateral edge, such as edge 23 or 24, of load beam 12.

The above described striking and rubbing interactions between head suspension 8 and damping member 30 have been found to effectively dissipate energy which drives resonance vibrations of head suspension 8. To demonstrate this, tests were run on 6 different model 2030 head suspensions, available from Hutchinson Technology Incorporated of Hutchinson, Minn. The first model 2030 head suspension was not equipped with any particular damping apparatus. The second through sixth model 2030 head suspension, however, included attached flexures such as flexure 16, shown in FIG. 1, having an elongated portion 16a and a damping member 30. The length of the damping members from the mounting point to the free end thereof was varied for the second through sixth model 2030 head suspensions. First torsion resonance mode gain was measured for each of the six model 2030 head suspensions. Results of the test are shown below in Table A.

The first column gives the variation number, the second column gives the length in millimeters (mm) (from the center of the attachment point of the damping member to the load beam 12 to the tip of the free end of the damping member) of the damping member associated with a particular variation number, and the third column gives the gain (the ratio of the amplitude of the motion of a head suspension at the head slider to the amplitude of the motion input into a head suspension at its base) in decibels (dB) of vibrations at the first torsion resonance frequency of each variation.

TABLE A

| VARIATION NO. | MEMBER LENGTH (mm) | GAIN (dB) |
|---|---|---|
| 1 | (No Member) | 6.67 |
| 2 | 1.03 | 3.82 |
| 3 | 1.53 | 3.72 |
| 4 | 2.03 | 1.32 |
| 5 | 2.53 | 0.98 |
| 6 | 3.03 | 1.24 |

For samples tested, addition of a damping member such as damping member 30 reduced gain minimum of 2.85 dB (variation no. 2) to a maximum of 5.69 dB (variation no. 5). However, other variations are possible. As noted above, the advantageous results obtained when the free end of damping member 30 extends over an edge of head suspension 8 is reflected in these results; variations 2 and 3 were not long enough to extend over the edge equivalent to edge 24 of load beam 8 and variations 4–6 were. And from variation 3 to variation 4, the gain dropped 1.4 dB. As noted above, it is thought that this is due to the increased frictional interaction between edge 24 of load beam 8 and damping member 30 acting to dissipate energy driving vibrations at a resonance frequency. Accordingly, it is preferable, though not necessary, that a free end of the damping member extend over an edge of the head suspension.

It should be noted the striking and rubbing interactions between damping member 30 and head suspension 8 which act to damp vibrations at a resonance mode frequency thereof can be augmented by "tuning" damping member 30 to have a resonance mode frequency (preferably a bending resonance mode) substantially equal to that of head suspension 8. Such tuning of damping member 30 is disclosed in co-pending patent application entitled "Head Suspension with Dynamic Vibration Absorption Extension" filed Nov. 6, 1997 commonly owned by the assignee of the present application Ser. No. 08/979,891; the entire disclosure of which is hereby incorporated by reference.

To fabricate load beam 12, blanks having the dimensions of load beam 12 are cut or otherwise formed from a sheet of stainless steel. The blanks are then formed by chemical etching or other known methods to provide a spring region 18, rigid region 22, and mounting region 14.

Figure 4:
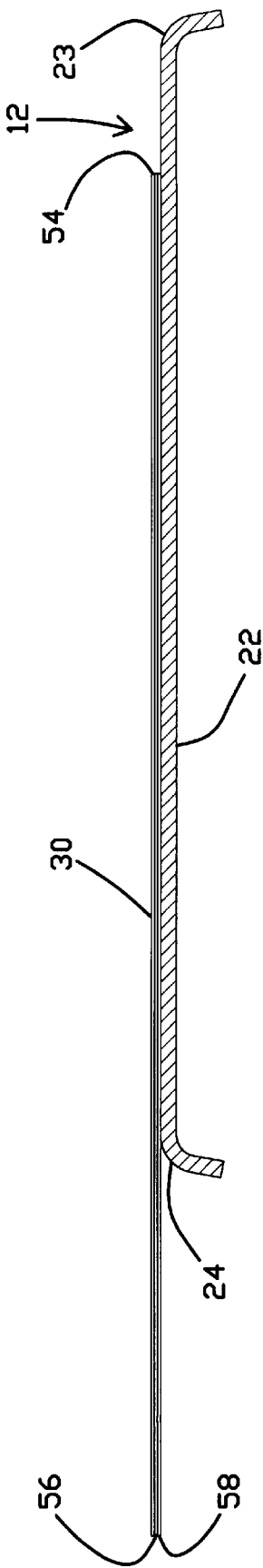
FIG. 4 is a sectional view of the head suspension and damping member shown in FIG. 1 taken along section line 4—4 of FIG. 1.
Figure 5:
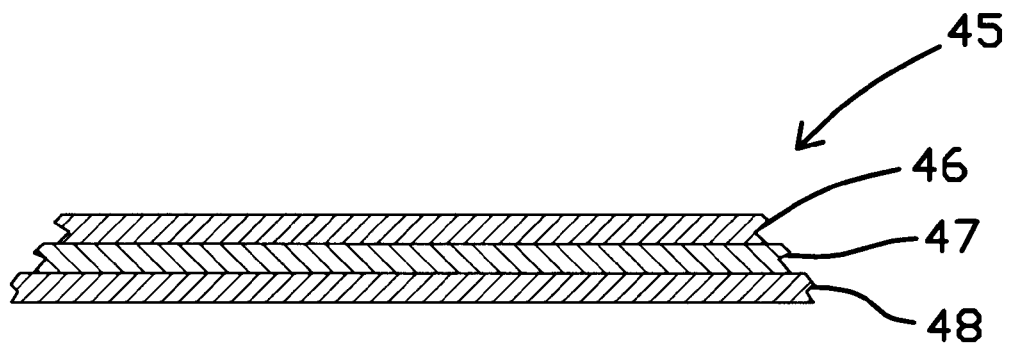
FIG. 5 is a cross-sectional side view of a laminated sheet of material useful in the fabrication of the head suspension shown in FIG. 1.

Damping member 30 and flexure 16, including elongated portion 16a, tongue 21, and arms 29a and 29b can be formed from any resilient material such as stainless steel or stainless steel coated with other materials. As shown in FIG. 4, which is a sectional view of load beam taken along section line 4—4 of FIG. 1, damping member 30 is preferably formed having three laminated layers. Though damping member 30 does not need to be laminated, if damping member is laminated, it will provide more energy dissipation because of sheering taking place in the laminated layers during a vibration of damping member 30. Thus, laminating damping member 30 can provide more effective damping. A preferred laminate comprises an upper layer of copper 54 overlays a middle layer of dielectric 56 such as polyimide, and which overlays a base layer of stainless steel 58. Accordingly, it is preferable to form flexure 16 and damping member from a single laminated sheet 45, such as shown in FIG. 5, which has a first layer 46 of copper overlaying a second layer 47 of polyimide overlaying a third layer 48 of stainless steel. The formation of flexures from laminated sheets such as sheet 45 is fully disclosed in U.S. Pat. No 5,598,307, issued Jan. 28, 1997 to Bennin for Integrated Gimbal Suspension Assembly, which is hereby incorporated by reference in its entirety.

Blanks having the dimensions of flexure 16 and damping member 30 can be cut or otherwise formed from laminated sheet 45. The blank can be chemically etched or otherwise cut to form damping member 30, elongated portion 16*a*, alignment apertures 60 and 62, tongue 21 and arms 29*a* and 29*b*. If desirable, the first layer of copper and the second layer of polyimide can then be stripped using known methods from flexure 16 and elongated portion 16*a*, leaving only damping member 30 as a laminated construction. Damping member 30 can be made from any other substantially rigid material whether laminated or not.

Because damping member 30 is formed integrally with flexure 16 in this embodiment, flexure 16, elongated member 16*a*, and damping member 30 can be simultaneously aligned and mounted to load beam 12 by adhesive, welding, or other known processes. Aligning and mounting flexure 16, elongated member 16*a* and damping member 30 to load beam 12 simultaneously has the advantage of reducing on manufacturing steps in fabricating head suspension 8. It has the further advantage of increasing the accuracy of alignment of damping member 30.

Figure 6:
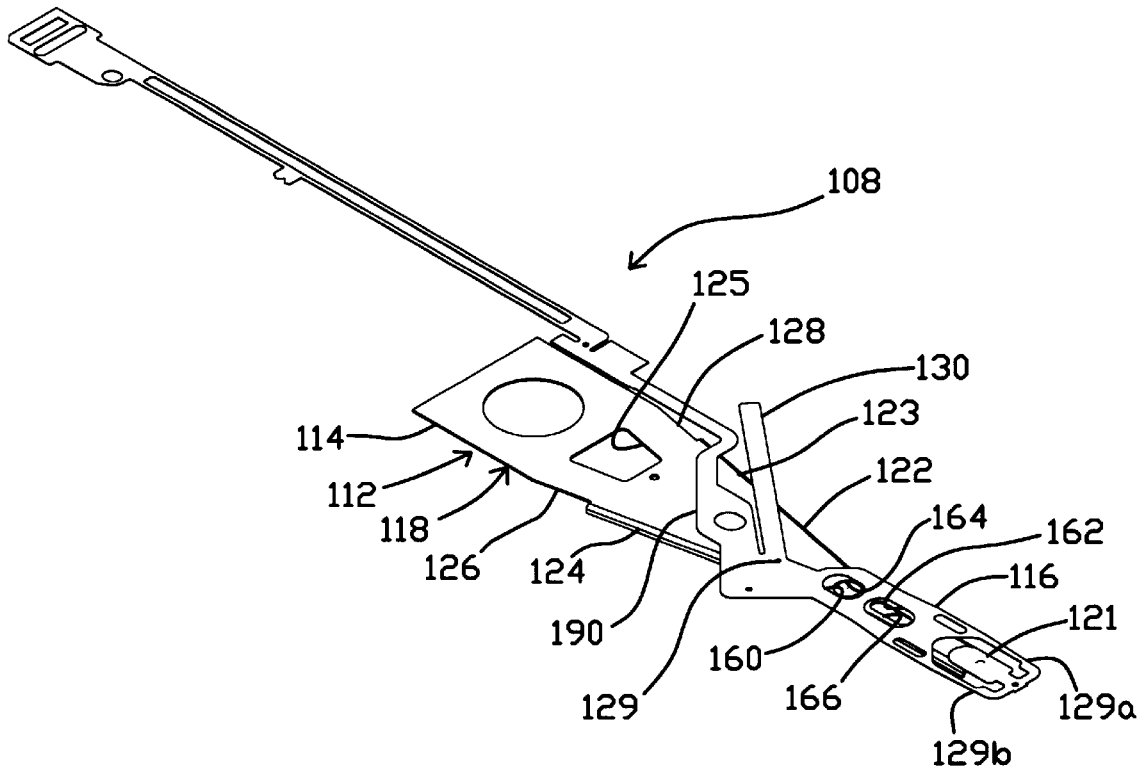
FIG. 6 is an isometric view of a second embodiment of a head suspension including a damping member unitary with a flexure and an elongated member in accordance with the present invention.

Another embodiment of a head suspension in accordance with the present invention and having a damping member formed integrally with the flexure is shown in FIG. 6. Elements in FIG. 6 functionally similar to those shown in FIG. 1 are labeled with like numerals incremented by 100. Head suspension 108 includes a load beam 112 having a mounting region 114, a spring region 118 with radius arms 126 and 128 separated by aperture 125, and a rigid region 122 distal to the spring region 118. First and second lateral edges 123 and 124, respectively, are at opposite edges of rigid region 122. Load beam 112 can also include alignment apertures 164 and 166 for alignment and mounting of flexure 116 to load beam 112. Flexure 116 can include tongue 121 supported between spring arms 129*a* and 129*b* to provide for pitch and roll motion of a head slider (not shown). Flexure 116 can also include alignment apertures 160 and 162 for alignment with apertures 164 and 166, respectively, when mounting flexure 116 to load beam 112.

In the embodiment shown in FIG. 6, extending from a proximal end of flexure 116 is an elongated member 190. Preferably, elongated member 190 extends over the bottom surface (shown on top in FIG. 6) of the rigid region 122 of load beam 112, off load beam 112 past lateral edge 123 just distal of the spring region 118, and longitudinally adjacent to spring region 118 and mounting region 114. Elongated member 190 then preferably extends past the proximal end of load beam 112 to allow attachment of elongated component 190 to an actuator arm (not shown). Preferably, one face of elongated component 190 can then be used to support electrical leads (not shown) for electrically connecting a read/write head (not shown) to data electronics.

In the embodiment of FIG. 6, elongated component 190 also includes damping member 130 extending diagonally across the rigid region 122 of load beam 112. Damping member 130 is preferably attached to load beam 112 at attachment point 129 adjacent to edge 124 of load beam 112 and where damping member 130 joins with the remainder of elongated member 190. Damping member then crosses diagonally across rigid region 122 and extends over edge 123 of load beam 112. Like damping member 30, damping member 130 is preferably a narrow, rectangular strip and can be laminated, having a layer of rigid material such as stainless steel, a layer of electrically insulating material, such as polyimide, and a layer of electrically conducting material such as copper.

Though damping member 130 lays diagonally across load beam 112, it operates in substantially the same way as damping member 30 to damp torsional resonance vibrations of a load beam. A free end of damping member 130 is positioned to strike and/or rub load beam 112 approximately at a point in time when load beam 112 reaches a point of furthest excursion in the waveform of a torsional mode of resonance vibration sought to be damped, causing additional suppression of the vibrational motion. When the motion of the load beam reverses direction, the free end of damping member 130 lags behind the motion of the end of member 130 attached to load beam 112 creating an opposing moment at the attached end which also causes suppression of the vibrational motion.

Additionally, damping member 130 rubs against load beam 112 and in particular, against edge 123, during the above described resonance mode cycle thereof. The friction created by this rubbing, combined with the striking action of damping member 130 acts to dissipate energy driving the vibrations at a torsional resonance mode frequency of head suspension 108, damping these vibrations. As above, however, what matters is that the transverse extent of the damping member 130 is sufficient to cause striking and/or rubbing with a surface or the edge of the load beam 112 based on displacement caused by a torsional mode.

Further, because damping structure 130 has a component in the longitudinal direction of head suspension 108, damping structure 130 can also be effective in damping longitudinal bending resonance modes of head suspension 108. During a vibration of the head suspension at a longitudinal bending mode resonance frequency, a first surface portion of the head suspension proximal to a second surface portion of the head suspension will, at some time during a cycle of the vibration, move in an opposite direction to the second surface portion. As such, for a longitudinal bending resonance mode having a first such surface portion to which damping member is mounted at attachment point 129 and second such surface portion over which a section of damping member 130 extends, damping member 130 can damp vibrations of head suspension 130 if frictional contact occurs at the resonance mode frequency of that longitudinal bending mode based upon the degree of relative movement.

Load beam 112 can be fabricated in substantially the same manner as load beam 12. Flexure 116, elongated member 190, and damping member 130 can be fabricated in substantially the same manner as flexure 16, elongated member 16*a* and damping member 30, respectively. However, rather than stripping the copper layer and polyimide layer, electrical leads extending along elongated member 190 (if desired) can advantageously also be formed from the top layer of copper of the laminated sheet by chemically etching the layer of copper such as taught in U.S. Pat. No. 5,598,307, issued Jan. 28, 1997 to Bennin for Integrated Gimbal Suspension Assembly, which has been incorporated by reference in its entirety. Alignment apertures 160 and 162 of flexure 116 are aligned with alignment apertures 164 and 166 of load beam 112 for mounting flexure 116, and elongated member 190 including damping member 130 to load beam 112. Because in the embodiment shown in FIG. 6, damping member 116 is formed integrally with flexure 116, flexure 116, elongated member 190, and damping member 130 can be simultaneously aligned and mounted to load beam 112 by adhesive, welding, or other known processes. Aligning and mounting both flexure 116 and elongated member 190 including damping member 130 to load beam 112 simultaneously has the advantage of reducing manufacturing steps in fabricating head suspension 108. It has the further advantage of increasing the accuracy of alignment of damping member 130 and elongated member 190.

Figure 7:
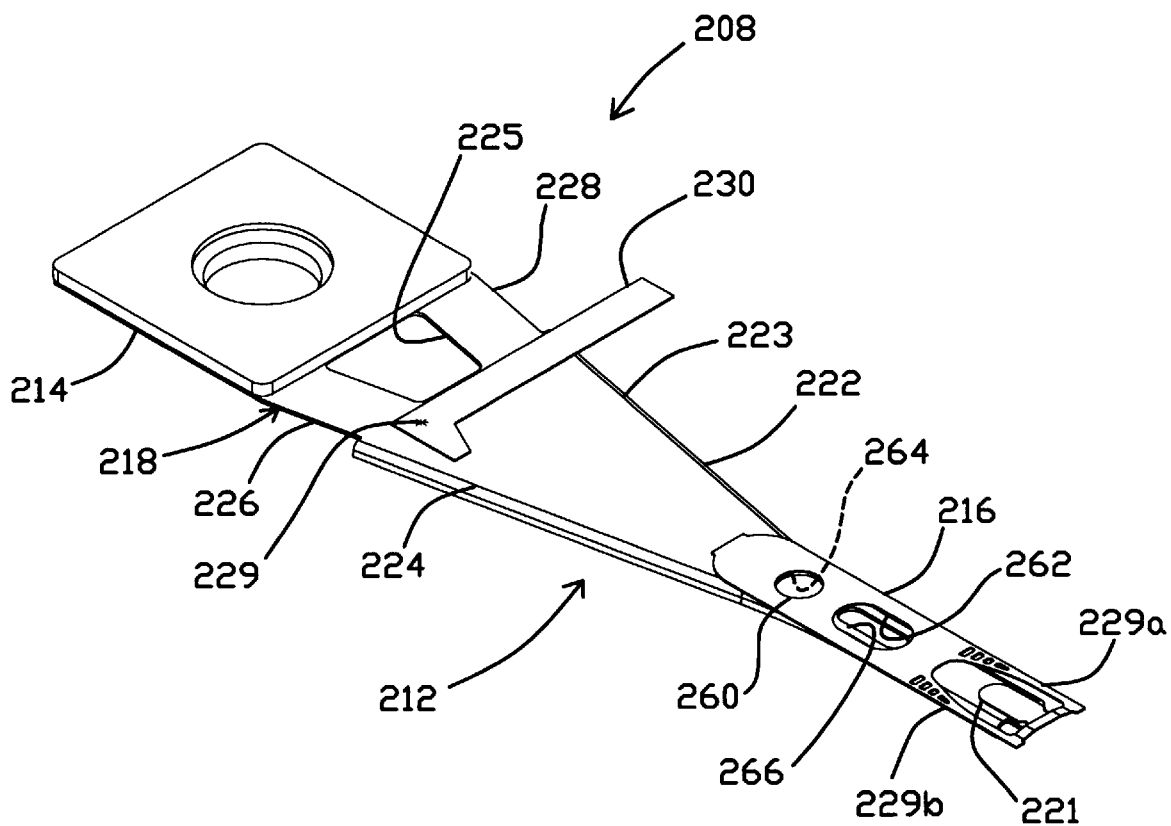
FIG. 7 is an isometric view of a third embodiment of a head suspension including a damping member formed separately from the load beam and the flexure, and extending transversely across a load beam in accordance with the present invention.

Another embodiment of a head suspension including a damping member extending from the rigid region of the load beam in accordance with the present invention is shown in FIG. 7. Elements in FIG. 7 functionally similar to those of FIG. 1 are labeled with like numerals incremented by 200. Head suspension 208 includes a load beam 212 having a mounting region 214, a spring region 218 with radius arms 226 and 228, and a rigid region 222 distal to the spring region 218. First and second lateral edges 223 and 224, respectively, are at opposite sides of rigid region 222. Load beam 212 also includes alignment apertures 264 and 266 for alignment and mounting of flexure 216 at the distal end of load beam 212. Flexure 216 is located at a distal end of load beam 212.

A damping member 230 extends from a point on the bottom surface (shown on top in FIG. 7) of rigid region 222 just distal of radius arm 226 and adjacent to lateral edge 224 across the rigid region 222 and over lateral edge 223. Damping member 230 can be attached to load beam 212 by adhesive, welding, or other known means at attachment point 229 just distal of radius arm 226. Like damping member 30, damping member 230 is preferably a narrow, rectangular strip and can be a laminated construction, having a layer of rigid material such as stainless steel, a layer of electrically insulating material, such as polyimide, and a layer of electrically conducting material such as copper.

Because damping member 230 is attached adjacent to edge 224 of load beam 212 and extends over the opposite edge 223 thereof, damping member 230 will operate in substantially the same way as damping member 30 to damp vibrations of head suspension 208 at torsional resonance mode frequencies thereof. As above, what matters is that the transverse extent of the damping member 230 is sufficient to cause striking and/or rubbing with a surface or the edge of the load beam based on displacement caused by a torsional mode.

To fabricate load beam 212, blanks having the dimensions of load beam 212 can be cut or otherwise formed from a sheet of stainless steel. The blanks are then formed to provide a spring region 218, including aperture 225, rigid region 222, mounting region 214, and alignment apertures 264 and 266. To fabricate flexure 216, blanks having the dimensions thereof can be cut or otherwise formed from a sheet of stainless steel or other substantially rigid material. The blanks can be formed to provide tongue 221, arms 229a and 229b, and alignment apertures 260 and 262. Damping member 230 can be chemically etched or otherwise cut from a laminated sheet of material such as laminated sheet 45 shown in FIG. 4. As noted above, damping member 230 can also be made from any other substantially rigid material whether laminated or not.

Damping member 230 is mounted to load beam 212 at attachment point 229 either by welding, adhesive, or other known means. Flexure 216 is also mounted to load beam 212 by either welding, adhesive or other known means.

Figure 8:
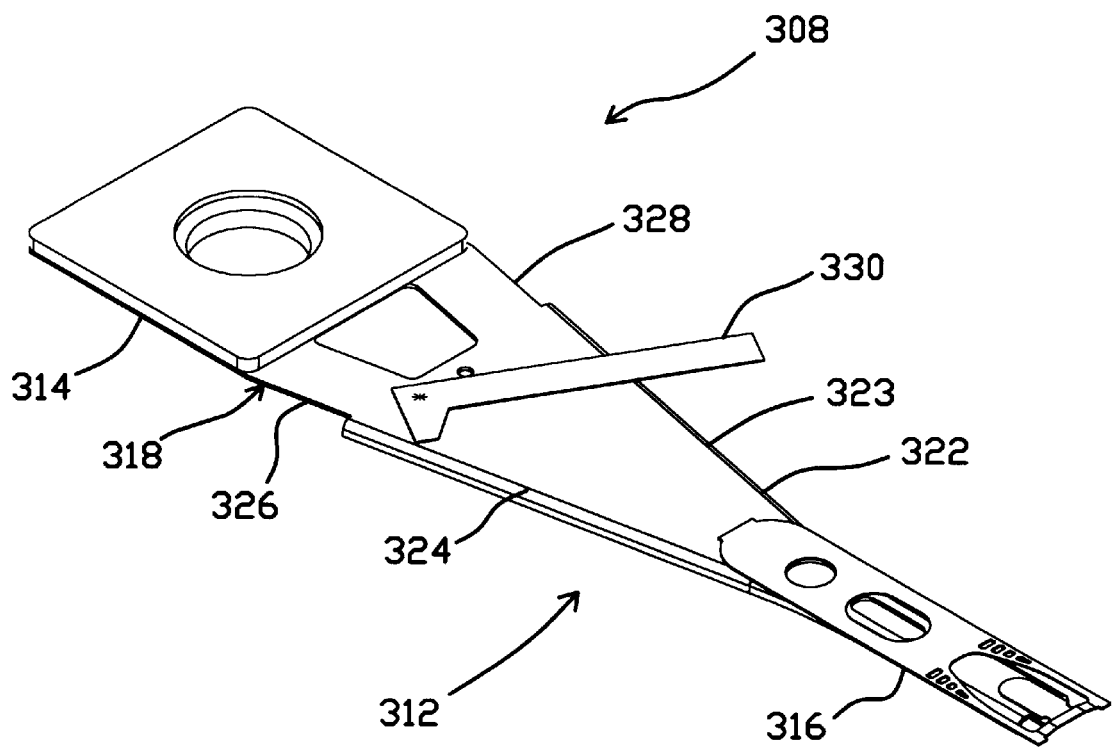
FIG. 8 is an isometric view of a fourth embodiment of a head suspension including a damping member formed separately from the load beam and the flexure, and extending diagonally across a load beam in accordance with the present invention.

FIG. 8 shows another embodiment of a head suspension having a damping member extending diagonally across the rigid region of the load beam. Elements in FIG. 8 functionally similar to those of FIG. 1 are labeled with like numerals incremented by 300. Head suspension 308 includes a load beam 312 having a mounting region 314, a spring region 318 with radius arms 326 and 328, and a rigid region 322 distal to the spring region 318. First and second lateral edges 323 and 324, respectively, are formed in the rigid region 322. A flexure 316 is located at a distal end of load beam 312. A damping member 330 extends from a point in the rigid region 322 just distal of radius arm 326 diagonally across the rigid region 322 and over lateral edge 323 of load beam 312. Damping member 330 can be attached to load beam 312 by adhesive, welding, or other known means. Like damping member 30, damping member 330 is preferably a narrow, rectangular strip and can have a laminated construction, having a layer of rigid material such as stainless steel, a layer of electrically insulating material, such as polyimide, and a layer of electrically conducting material such as copper.

Though damping member 330 extends diagonally across load beam 312, rather than in an exclusively transverse direction, because damping member 330 is attached adjacent to edge 324 of load beam 312 and extends over the opposite edge 323 thereof, damping member 330 will operate in substantially the same way as damping member 30 to damp vibrations of head suspension 308 at torsional resonance mode frequencies thereof. As above, what matters is that the transverse extent of the damping member 330 is sufficient to cause striking and/or rubbing with a surface or the edge of the load beam based on displacement caused by a torsional mode. This can be determined empirically or by modeling. Head suspension 308 including damping member 330 can be fabricated in substantially the same manner as head suspension 8 and damping member 30.

Further, because damping member 330 extends in a diagonal direction from its mounting point, it has a longitudinal component on load beam 312. As such, damping member 330 can damp vibrations at longitudinal bending resonance mode frequencies of head suspension 308 in the same way that damping member 130 can damp vibrations of head suspension 108 at longitudinal bending resonance mode frequencies thereof.

Figure 9:
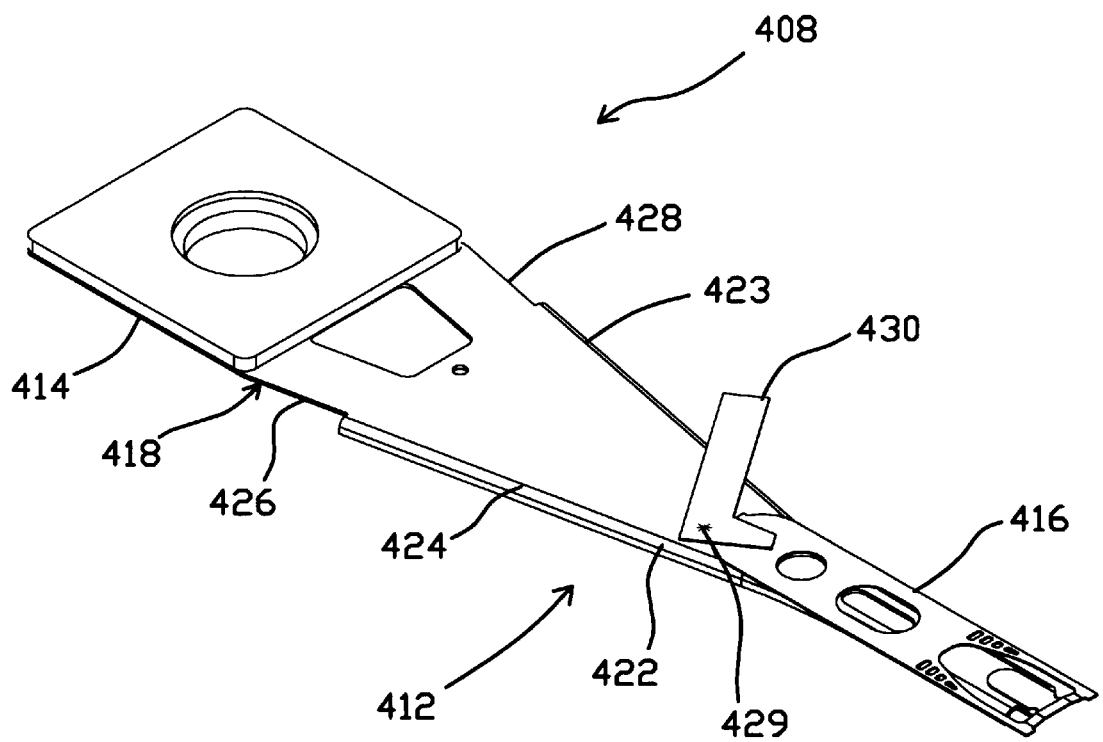
FIG. 9 is an isometric view of a fifth embodiment of a head suspension including a damping member formed separately from the load beam and the flexure, and extending from a point adjacent to the flexure diagonally across a load beam in accordance with the present invention.

FIG. 9 shows another embodiment of a head suspension having a damping member extending diagonally across the rigid region of the load beam in accordance with the present invention. Elements in FIG. 9 functionally similar to those of FIG. 1 are labeled with like numerals incremented by 400. Head suspension 408 includes a load beam 412 having a mounting region 414, a spring region 418 with radius arms 426 and 428, and a rigid region 422 distal to the spring region 418. First and second lateral edges 423 and 424, respectively, are formed in the rigid region 422. A flexure 416 is located at a distal end of load beam 412. A damping member 430 extends from a point in the rigid region 422 adjacent to flexure 416 diagonally thereacross and over lateral edge 423 of load beam 412. Damping member 430 is attached to load beam 412 by adhesive, welding, or other known means. Like damping member 30, damping member 430 is preferably a narrow, rectangular strip and can be a laminated construction, having a layer of rigid material such as stainless steel, a layer of electrically insulating material, such as polyimide, and a layer of electrically conducting material such as copper.

Damping member 430 is attached to load beam 412 at attachment point 429 adjacent to edge 424 and a proximal end of flexure 416, and extends diagonally across rigid region 422 and over edge 423. As such, though damping member 430 is mounted to load beam 412 adjacent to flexure 416, rather than adjacent to spring region 418, it operates in substantially the same way as damping member 30 to damp torsional resonance vibrations of load beam 412. As above, what matters is that the transverse extent of the damping member 430 is sufficient to cause striking and/or rubbing with a surface or the edge of the load beam based on displacement caused by a torsional mode. Head suspension 408 including damping member 430 can be fabricated in substantially the same manner as head suspension 8 and damping member 30.

Further, because damping member 430 extends in a diagonal direction from its mounting point, it has a longitudinal component on load beam 412. As such, damping member 430 can damp vibrations at longitudinal bending resonance mode frequencies of head suspension 408 is the same way that damping member 130 damps vibrations of head suspension 108 at longitudinal bending resonance mode frequencies thereof.

Figure 10:
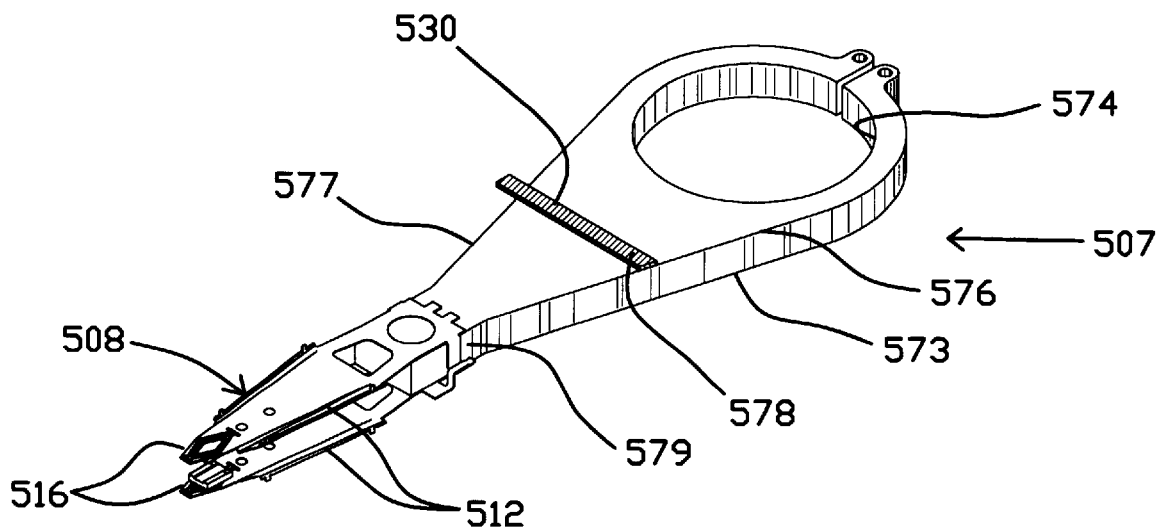
FIG. 10 is an isometric view of a head suspension in combination with an actuator arm, the actuator arm having a damping member in accordance with the present invention.

FIG. 10 shows a further application also in accordance with the present invention. Elements in FIG. 10 similar to those of FIG. 1 are shown with like numerals incremented by 500. FIG. 10 shows actuator arm/head suspension combination 507. Head suspensions 508 including load beams 512, having integrally formed flexures 516, are attached to an actuator arm 573 at a mounting portion 579 thereof. Actuator arm 573 is for attaching head suspensions 508 to a voice coil or other type of actuator (not shown) to move head suspensions 508 over the surface of a spinning disk (not shown). Actuator arm 573 includes first edge 576 and second edge 577 and can include substantially circular aperture 574 for attaching actuator arm 573 to a voice coil actuator.

In the embodiment shown in FIG. 10, actuator arm 573 includes damping member 530 which extends transversely across actuator arm 573 from first edge 576 thereof across second edge 577 thereof. Damping member 530 is attached to actuator arm 573 at attachment point 578 adjacent to first edge 576. The remainder of damping member 530 is free to vibrate.

Like head suspension 30, actuator arm/head suspension combination 507 can vibrate at resonance mode frequencies at which the gain at the distal end of flexures 516, where head sliders would be mounted, of a vibration input at aperture 574 is relatively large. Such vibrations of actuator arm/head suspension combination 507 are undesirable for the same reasons that vibrations at a resonance mode frequency of head suspension 8 are undesirable, namely, such vibrations can increase data storage and retrieval times.

To reduce the gain of vibrations of actuator arm/head suspension combination 507 at a resonance mode frequency thereof, damping member 530 and actuator arm 573 undergo substantially the same striking and rubbing actions as damping member 30 and load beam 12, respectively. Accordingly, damping member 530 operates in substantially the same way as damping member 30 to damp torsional resonance vibrations of actuator arm/head suspension combination 507. As above, what matters is that the transverse extent of the damping member 530 is sufficient to cause striking and/or rubbing with a surface or the edge of actuator arm 573 based on displacement caused by a torsional mode.

Actuator arm 573 can be formed from stainless steel or other resilient material in a conventional manner. Damping member 530 can also be formed from exclusively stainless steel but is preferably laminated in the same way as damping member 30. Load beams 512 can be formed simultaneously with and unitarily with flexures 516, respectively, using known processes. Load beams 512 can then be mounted to the mounting portion 579 of actuator arm 573 by welding, adhesive or other known processes.

Figure 11:
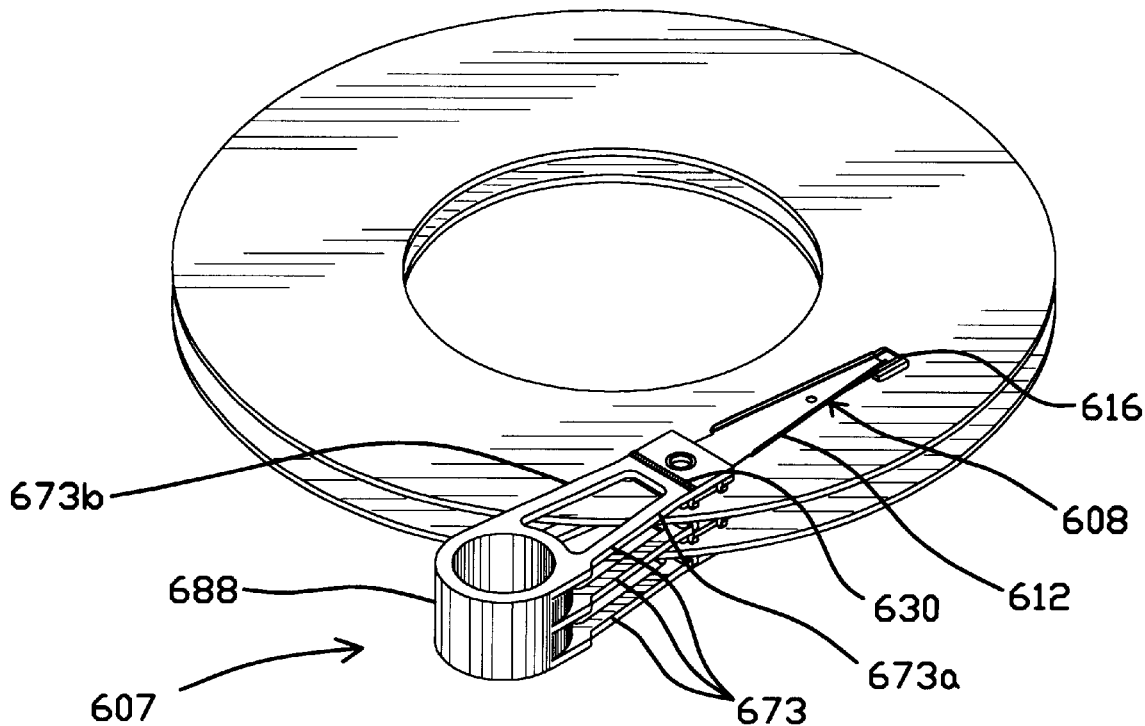
FIG. 11 is an isometric view of a head suspension in combination with an E-block actuator having a plurality of actuator arm portions and a plurality of head suspensions, the E-block including at least one damping member in accordance with the present invention.

A further application also in accordance with the present invention is shown in FIG. 11. Elements in FIG. 11 functionally similar to those of FIG. 10 are shown with like numerals incremented by 100. FIG. 11 shows an E-block/head suspension combination 607. Head suspensions 608 each include a load beam 612 and a flexure 616. In the embodiment shown in FIG. 11, E-block 688 includes three actuator arm portions 673 and is for connecting head suspensions 608 to a voice coil or other type of actuator. It is also contemplated that E-block 688 include more or less than three actuator arm portions.

Like actuator arm/head suspensions combination 507, E-block/head suspension combination 607, including actuator arm portions 673, can vibrate at resonance mode frequencies which have undesirably high gains. Such vibrations of E-block/head suspension combination 607 are undesirable for the same reasons that vibrations at a resonance mode frequency of head suspension 8 are undesirable, namely, such vibrations can increase data storage and retrieval times. Accordingly, a plurality of damping members 630 (only one shown) can be located on actuator arm portions 673 to damp such vibrations.

In the embodiment shown in FIG. 11, damping members 630 are attached to actuator arm portions 673 adjacent to first edges 673a thereof and extend transversely across actuator arm portions 673 and over opposite edges 673b thereof.

To reduce the gain of vibrations of E-block/head suspension combination 607 at a resonance mode frequency thereof, damping members 630 and actuator arm 673 undergo substantially the same striking and rubbing actions as damping member 30 and load beam 12, respectively. Accordingly, damping members 630 operates in substantially the same way as damping member 30 to damp torsional resonance vibrations of E-block/head suspension combination 607. As above, what matters is that the transverse extent of damping members 630 is sufficient to cause striking and/or rubbing with a surface or the edge of actuator arm portions 673 based on displacement caused by a torsional mode.

E-block 688 can be fabricated from stainless steel or other substantially rigid material using known procedures. Load beams 612 and flexures 616, can be fabricated in substantially the same manner as head suspension 8 shown in FIG. 1. Damping members 630 can be formed from exclusively stainless steel or other rigid material but are preferably laminated in the same way as damping member 30. Load beams 612 can then be mounted to actuator arm portions 673 of E-block 688.

Figure 12:
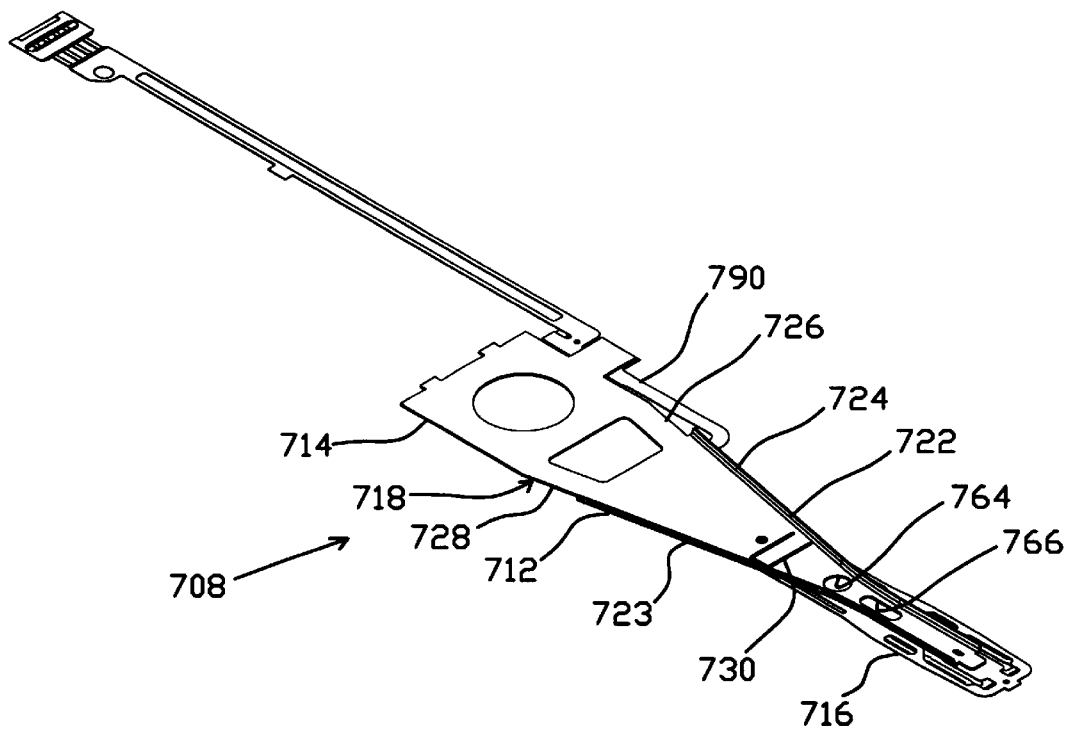
FIG. 12 is an isometric view of yet another embodiment of a head suspension including a damping member that is provided unitary with a load beam and overlaying a flexure in accordance with the present invention.
Figure 13:
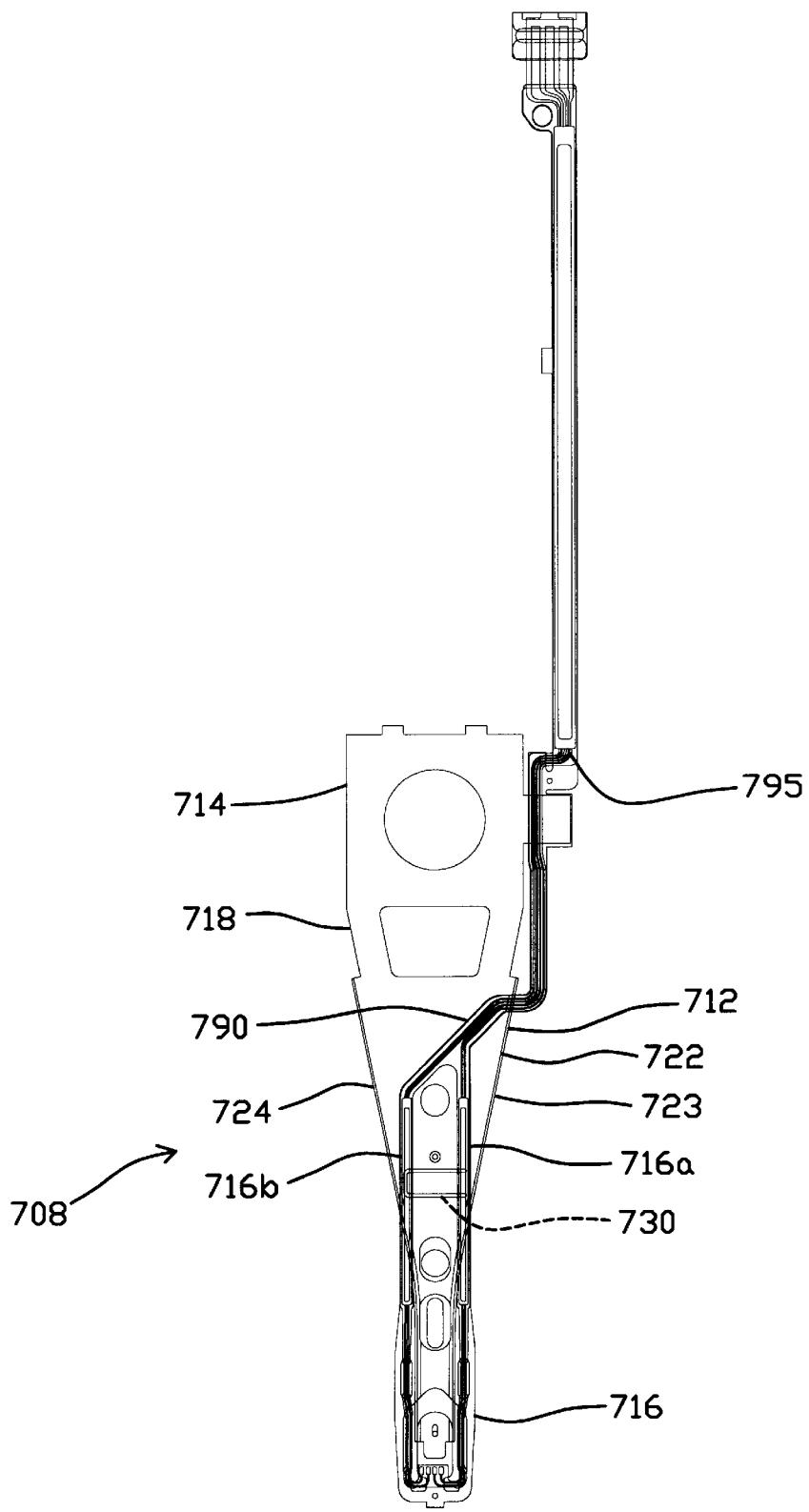
FIG. 13 is a bottom view of the head suspension shown in FIG. 12.

Yet another embodiment of the present invention is shown in FIGS. 12 and 13. FIG. 12 is a top isometric view of head suspension 708. Head suspension 708 includes a load beam 712 having a mounting region 714, a spring region 718 with radius arms 726 and 728, and a rigid region 722 distal to the spring region 718. First and second lateral edges 723 and 724, respectively, are at opposite sides of rigid region 722. A flexure 716 is located at the distal end of load beam 712. Load beam 712 also includes alignment apertures 764 and 766 for alignment and mounting of flexure 716 at the distal end of load beam 712.

A damping member 730 is formed integrally with load beam 712 in the rigid region 722 thereof. Damping member 730 preferably comprises a rectangular strip attached to the rigid region 722 adjacent to or near lateral edge 724, and extending laterally across rigid region 722 to a point adjacent to or near lateral edge 723. Damping member 730 is shown coplanar with the planar surface of the rigid region 722 but need not be. Damping member 730 is preferably attached to load beam 712 on only one side and thus remains free to move within its defining opening including the ability to pass out of the plane of the planar surface of the rigid region 722 on three sides. Like damping member 30, damping member 730 can be a laminate construction, having a layer of rigid material such as stainless steel, a layer of electrically insulating material, such as polyimide, and a layer of electrically conducting material such as copper.

FIG. 13 is a bottom view of head suspension 708. In the embodiment shown in FIGS. 12 and 13, an elongated member 790 extends from a proximal end of flexure 716 which may otherwise be of conventional construction. Preferably, elongated member 790 extends over the bottom surface (shown on top in FIG. 13) of the rigid region 722 of load beam 712, off load beam 712 past lateral edge 723 just distal of the spring region 718, and longitudinally adjacent to spring region 718 and mounting region 714. Elongated member 790 then preferably extends past the proximal end of load beam 712 to allow attachment of elongated member 790 to an actuator arm (not shown). Preferably, one face of elongated member 790 can then be used to mount electrical leads 795 for electrically connecting a read/write head (not shown) to data electronics (not shown).

As shown in FIG. 13, flexure 716 includes a mounting portion thereof which extends beneath damping member 730. Flexure 716 has a first edge 716a adjacent to edge 723 of load beam 712 and a second edge 716b adjacent to edge 724 of load beam 712. As noted above, damping member 730 is attached to the rigid region 722 of load beam 712 adjacent to edge 724 of load beam 712. Accordingly, damping member 730 is also attached to load beam 712 near second edge 716b of flexure 716. The free end of damping member 730 extends over first edge 716a of flexure 716. In this way, when load beam 712 undergoes vibrations at a torsional mode resonance frequency, damping member 730 can strike the surface of flexure 16 beneath and facing damping member 730 in substantially the same way as damping member 30 can strike load beam 12. Also, damping member can rub the surface of flexure 16 beneath and facing damping member 730 including first edge 716a of flexure 16 in substantially the same way as damping member 30 can rub load beam 12 and edge 24. Accordingly, damping member 730 will operate in substantially the same way as damping member 30 to damp torsional vibrations of head suspension 708 at a resonance mode frequency thereof. This construction is particularly advantageous because no additional mass or thickness is added to head suspension 708 by the addition of damping member 730. As noted above, reduced mass can decrease disk storage and retrieval time.

Load beam 712 can be fabricated in substantially the same manner as load beam 12. Flexure 716, elongated member 790, and damping member 730 can be fabricated in substantially the same manner as flexure 116.

It is also within the ambit of the present invention to reverse the head suspension structure shown in FIG. 13. Specifically, a damping member can be formed in the mounting portion of the flexure such that the damping member can strike and/or rub a facing surface of the load beam and extend over an edge thereof.

Though the present invention has been described with reference to preferred embodiments, those skilled in the art will recognize that changes can be made in form and detail without departing from the spirit and scope of the invention.

What is claimed is:

1. A head suspension for supporting a head slider within a dynamic rigid disk drive, comprising: a load beam having a mounting region at a proximal end, a rigid region spaced distally from the mounting region, and a spring region between the mounting region and the rigid region; and a flexure at a distal end of the load beam and for supporting the head slider; the head suspension further including a first surface portion and a second surface portion that, during a vibration of the head suspension at a resonance mode frequency thereof, will move in opposite directions with respect to each other, the head suspension further including a damping member having a mounting portion attached to the head suspension distally of the mounting region of the load beam, the mounting portion of the damper member being attached at the first surface portion of the head suspension and cantilevered with an unattached portion of the damping member having a free end, the unattached portion extending over the second surface portion of the head suspension, said free end of the damping member positioned so that during vibration of the head suspension at the resonance mode frequency thereof the damping member will frictionally contact the second surface portion of the head suspension to damp the vibration of the head suspension at the resonance mode frequency thereof.

2. The head suspension of claim 1 wherein:
   the head suspension includes a first edge and a second edge spaced from the first edge; and
   the mounting portion of the damping member is attached to the head suspension near the first edge thereof and the free end of the damping member extends over the second edge thereof such that the unattached portion of the damping member frictionally contacts the second edge during vibration of the head suspension at the resonance mode frequency thereof.

3. The head suspension of claim 2 wherein the damping member is formed unitarily with the flexure.

4. The head suspension of claim 3 including an elongated member extending from a proximal end of the flexure wherein the damping member is attached to and formed unitarily with the elongated member.

5. The head suspension of claim 1 wherein the damping member extends diagonally across the rigid region of the load beam.

6. A head suspension for supporting a head slider within a dynamic rigid disk drive, comprising: a load beam having a mounting region at a proximal end, a rigid region spaced distally from the mounting region, and a spring region between the mounting region and the rigid region; and a flexure at a distal end of the load beam and for supporting the head slider; said head suspension further including a damping member having a mounting portion attached to the head suspension distally of the mounting region of the load beam at a location spaced from a central longitudinal axis of the head suspension and further having an unattached portion cantilevered from the mounting portion transversely across the longitudinal axis to a free end thereof, said free end positioned so that during vibration of the head suspension at a torsional resonance mode frequency thereof the damping member frictionally contacts a portion of the head suspension to damp the vibration of the head suspension at the torsional resonance mode frequency thereof.

7. The head suspension of claim 6 wherein:
   the head suspension includes a first edge and a second edge transversely spaced from the first edge; and
   the damping member is attached to the head suspension near the first edge thereof.

8. The head suspension of claim 7 wherein the free end of the damping member extends over the second edge of the head suspension such that the unattached portion of the damping member frictionally contacts the second edge during vibration of the head suspension at the resonance mode frequency thereof.

9. The head suspension of claim 8 wherein:
   the rigid region of the load beam includes a first lateral edge and a second lateral edge transversely spaced from the first lateral edge; and the damping member is attached to the load beam adjacent to the first lateral edge thereof and has a free end which extends over the second lateral edge of the load beam.

10. The head suspension of claim 9 wherein the member is attached to the rigid region of the load beam and extends transversely thereacross.

11. The head suspension of claim 9 wherein the elongated member is attached to the rigid region of the load beam and extends diagonally thereacross.

12. The head suspension of claim 9 wherein the damping member is formed unitarily with the flexure.

13. The head suspension of claim 12 wherein the damping member is attached to the rigid region of the load beam and extends transversely thereacross.

14. The head suspension of claim 13 including an elongated member extending from a proximal end of the flexure wherein the damping member is attached to and formed unitarily with the elongated member.

15. The head suspension of claim 12 including an elongated member extending from a proximal end of the flexure and for supporting electrically conducting leads wherein the damping member is attached to and formed unitarily with the elongated member.

16. The head suspension of claim 15 wherein the damping member extends diagonally across the rigid region of the load beam.

17. In combination with the head suspension of claim 6, an actuator arm having the head suspension attached thereto, and including an actuator arm damping member mounted to the actuator arm.

18. In combination with the head suspension of claim 6, an E-block having at least one actuator arm portion with the head suspension attached thereto, and including an actuator arm damping member attached to the actuator arm portion.

19. The head suspension of claim 6 wherein:

the damping member is unitary with the rigid region of the load beam, is connected to the load beam along at least a first edge of the damping member, and the damping member lays in a same plane with the load beam; and the flexure extends beneath the damping member such that the damping member overlays the flexure and can frictionally contact the flexure to damp vibrations of the head suspension at a resonance frequency thereof.

20. The head suspension of claim 19 wherein:

the flexure has at least a first lateral edge transversely spaced from the first edge of the damping member connecting the damping member to the load beam; and the damping member includes a free end which passes across the first lateral edge of the flexure.

21. A head suspension and actuator arm combination wherein one of the head suspension and the actuator arm includes a damping member wherein;

the head suspension includes;

a load beam having a mounting region at a proximal end, a rigid region spaced distally from the mounting region; and a flexure at a distal end of the load beam and for supporting a head slider; and a damping member extends from the head suspension and actuator arm combination, the damping member having a mounting portion attached to the head suspension and actuator arm combination at a location spaced from a central longitudinal axis of the head suspension and actuator arm combination and having an unattached portion cantilevered from the mounting portion transversely across the longitudinal axis to a free end of the damping member, the unattached portion extending over a portion of the head suspension, said free end positioned so that during a vibration of the head suspension and actuator arm combination at a torsional resonance mode frequency thereof the damping member frictionally contacts the portion of the head suspension and damping member combination to damp the vibration of the head suspension and actuator combination at the torsional resonance mode frequency thereof.

22. The head suspension and actuator arm combination of claim 21 wherein the head suspension and actuator arm combination includes a first lateral edge and a second lateral edge and the damping member is attached to the head suspension and actuator arm combination near the first lateral edge and includes a free end which extends over the second lateral edge.

23. A head suspension and E-block combination wherein one of the head suspension and the E-block includes a damping member wherein;

the head suspension includes;

a load beam having a mounting region at a proximal end, a rigid region spaced distally from the mounting region; and a flexure at a distal end of the load beam and for supporting a head slider; and a damping member extends from the head suspension and E-block combination, the damping member having a mounting portion attached to the head suspension and E-block combination at a location spaced from a central longitudinal axis of the head suspension and E-block combination and having an unattached portion cantilevered from the mounting portion transversely across the longitudinal axis to a free end of the damping member, the unattached portion extending over a portion of the head suspension, said free end positioned so that during a vibration of the head suspension and E-block combination at a torsional resonance mode frequency thereof the damping member frictionally contacts the portion of the head suspension and E-block combination to damp the vibration of the head suspension and E-block combination at the torsional resonance mode frequency thereof.

24. The head suspension and E-block combination of claim 23 wherein the head suspension and E-block combination includes a first lateral edge and a second lateral edge and the damping member is attached to the head suspension and E-block combination near the first lateral edge and includes a free end which extends over the second lateral edge.

* * * * *